July 1, 1924.
W. A. PEPPER
1,499,841
INSECT TRAP
Filed March 11, 1922     2 Sheets-Sheet 1
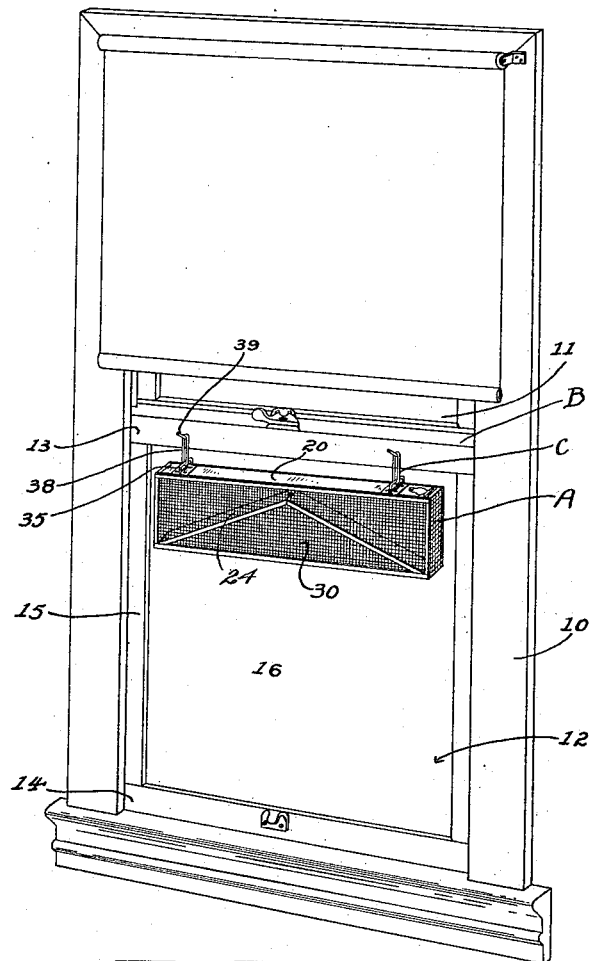
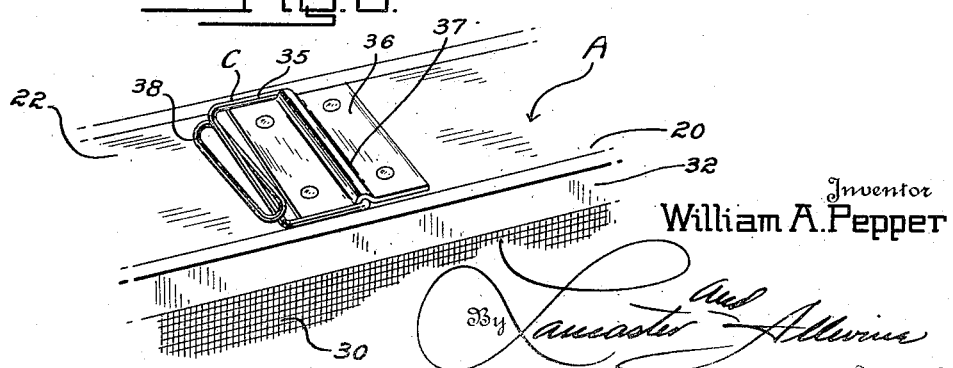
Inventor
William A. Pepper July 1, 1924.
W. A. PEPPER
INSECT TRAP
Filed March 11, 1922
1,499,841
2 Sheets-Sheet 2
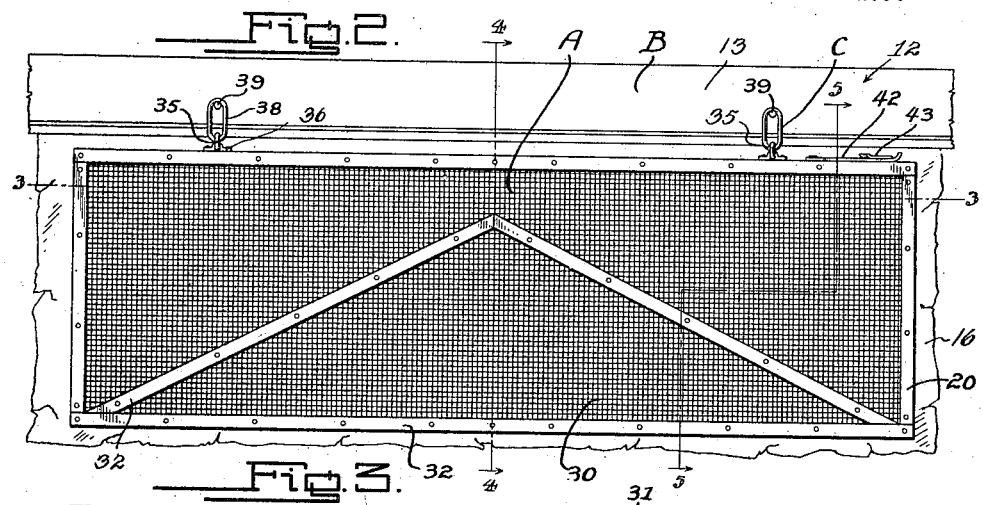
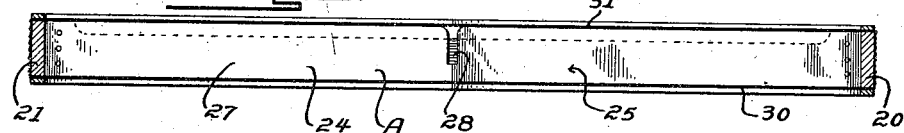
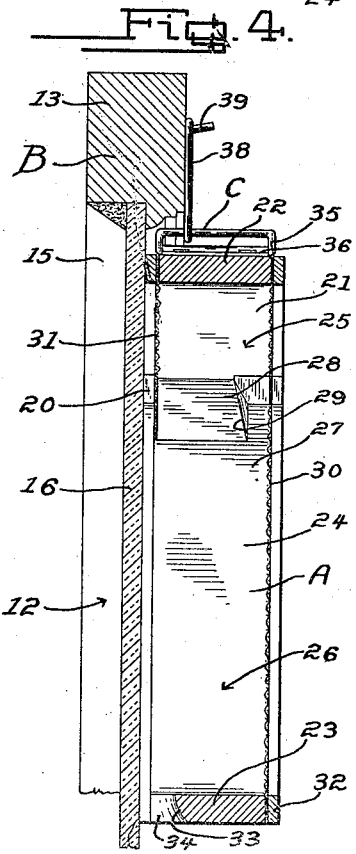
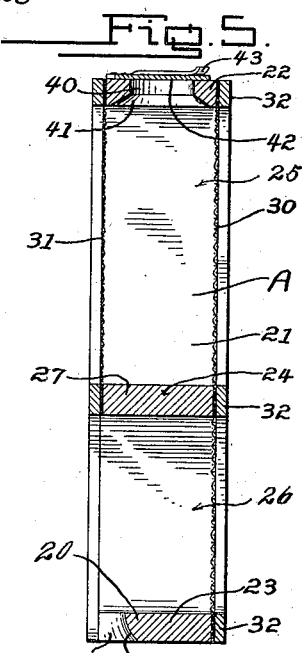
Inventor
William A. Pepper
Attorneys Patented July 1, 1924.

1,499,841

UNITED STATES PATENT OFFICE.

WILLIAM A. PEPPER, OF TULSA, OKLAHOMA.

INSECT TRAP.

Application filed March 11, 1922. Serial No. 542,957.

*To all whom it may concern:*

Be it known that I, WILLIAM A. PEPPER, a citizen of the United States, residing at Tulsa, in the county of Tulsa and State of Oklahoma, have invented certain new and useful Improvements in Insect Traps, of which the following is a specification.

This invention relates to insect traps and the primary object of the invention is the provision of a novel fly and mosquito trap adapted for association with a transparent body such as a window sash, and so constructed as to catch the flies and mosquitos as the same crawl up the window pane.

Flies and mosquitos are attracted by light and warmth and thus during the daytime the same can be seen in larger numbers on window and door panes. This well known fact has been utilized in the formulation of the invention, and another object of the invention is the provision of a trap which is so constructed as to fit snugly against the window or door glass adjacent to the upper end thereof, so that the trap may be in the path of the flies and insects as they crawl up the window or door glass, the trap having means for guiding the insects into the body portion of the trap as the same crawl up the glass.

A further object of the invention is the provision of a novel trap embodying a foraminous body for permitting the passage of light, means for suspending the body from a window sash or other transparent member, and a lower guide wall having an entrance opening formed therein communicating with the body portion of the trap.

A further object of the invention is the provision of an improved insect trap for association with a window pane or other transparent body embodying an upper trap section and a lower trap section, the lower trap section having means for guiding the insects toward the inlet slot, which communicates with the body portion of the trap, the lower trap section acting as a guard for preventing the insects from flying outward away from the transparent body, when the insects come into engagement with the guide wall.

A still further object of the invention is to provide an improved insect trap of simple and durable construction, which is so constructed that a single strip of screening can be utilized for the walls of the trap, thereby facilitating and reducing the cost of manufacture of the trap.

With these and other objects in view, the invention consists in the novel construction, arrangement and formation of parts, as will be hereinafter more fully described, claimed and illustrated in the accompanying drawings, forming a part of this specification, in which drawings:

Figure 1 is a perspective view of the improved insect trap disposed in operative position in relation to a window pane.

Figure 2 is a front elevation of the improved trap showing the same associated with a window sash.

Figure 3 is a horizontal longitudinal section through the trap, taken on the line 3—3 of Figure 2.

Figure 4 is a central vertical transverse section through the trap taken on the line 4—4 of Figure 2, showing the same associated with the window sash, the sash being also shown in transverse section.

Figure 5 is a transverse section through the trap taken on the line 5—5 of Figure 2, and Figure 6 is an enlarged fragmentary perspective view of the upper portion of the trap, showing the means for connecting the suspending means to the trap.

Referring to the drawings in detail, wherein similar reference characters designate corresponding parts throughout the several views, the letter A generally indicates the improved insect trap, and B, a window which it can be associated with.

While I have shown the trap associated with the window B, it is to be understood that the same can be used in connection with any transparent body or member, which light can pass through. The window B, as shown, includes the frame 10, the upper sash 11, and the lower sash 12. In the drawings, the trap A has been shown connected with the window sash 12 but, of course, can be associated with the upper sash if found desirable. The lower sash 12 includes the upper and lower rails 13 and 14, the side rails 15 and the window pane or glass 16.

The improved trap A includes essentially a frame 20 which can be either formed of wood or metal suitably painted. The frame 20, as shown, is made of wood, and consists of the side bars 21, which form the end walls of the trap, a top wall 22, which is connected in any preferred manner to the side bars 21 and a lower transversely extending bar or wall 23. Disposed intermediate the top wall 22 and the lower bar or wall 23 is the insect guiding device 24, which divides the trap A into an upper trap section 25 and a lower auxiliary trap section 26. As shown, this guiding device 24 consists of oppositely inclined bars 27, which extend inwardly and upwardly from the opposite lower corners of the trap A to the transverse center of the trap below the upper wall 22. The bars 27 are spaced a slight distance at their upper ends to provide an entrance slot or opening 28, and the lower faces of the bars 27 at their upper ends may be bevelled as at 29 to form a gently sloping surface to guide the flies or other insects into the main trap section 25 through the slot 28. The front and rear walls 30 and 31 of the traps are formed preferably from a single strip of wire screening and in applying the strip of screening to the frame, the same is first applied to the outer face of the frame 20 and tacked into place and then bent around the end bars or walls 21 and then around the rear face of the trap and tacked into position.

This forms a simplified means of connecting the strip of screening to the frame and eliminates the necessity of cutting out sections of wire screening for making the front and rear walls. The screen can be further held in position by thin strips 32, which can be nailed in position with the side bars 21, the top and lower walls 22 and 23 and the guide bars 27. The rear wall 31 of the trap A is trimmed off at its lower edge at the inclined bars 27, so as to leave the rear face of the lower trap section 26 open, and when the trap is placed against the pane of glass flies or other insects will be permitted to crawl up the glass unhindered until they reach the inclined guide strips 27 as can readily be seen by referring to Figure 4 of the drawings. The lower bar or wall 23 has its rear edge cut away as at 33 to provide a longitudinally extending entrance opening 34 for the lower or auxiliary trap chamber 26. This permits the free access of flies into the lower auxiliary trap chamber 26 when the flies crawl up the window pane 16.

In order to hold the trap A in position, the suspending device C is provided. As shown, by way of example, the suspending device C consists of bails 35 disposed adjacent to the ends of the trap A and carried by the top wall 22. These bails 35 extend transversely of the trap and can be secured in place in any preferred manner such as by metal straps 36. The metal straps 36 may have their intermediate portions struck up to provide barrels 37, in order that the bails can be swung down into intimate engagement with the top wall 22 when the trap is in transit. Each of the bails 35 has slidably mounted thereon a suspending loop 38 and these loops are adapted to engage suitable pins 39 or hooks which can be carried by the top rail 13 of the lower sash 12. It can be seen that these loops 38 are slidably mounted on the bails 35 and thus permit the trap to be slid inwardly upon the loops so that the trap can be placed into intimate engagement with the window pane 16 of the sash 12. The trap A, of course, can be made of any desired length, and if the trap exceeds a certain length, it is preferred that more than one entrance slot 28 be provided, and if more than one entrance slot is provided, it is, of course, to be understood that the number of inclined guard bars 27 will be increased to correspond therewith.

In order that dead flies may be easily removed from the trap, the top wall 22 adjacent to one end thereof is provided with a relatively large opening 40, which may have its lower edge bevelled as at 41 to guide the dead flies to the opening. The opening can be normally closed by a pivoted closure 42, which can be held tightly over the opening by a spring clip 43.

In applying the improved trap in operative position, the same is placed transversely of the sash 12 or other body with which it is associated adjacent to the upper end thereof, and the bails 35 are swung to their raised position and the loops 38 are swung over the pins 39 and the trap body is slid into intimate engagement with the window pane 16.

Now, it can be seen that when the flies crawl up the window pane, the same will unbeknowingly walk into the lower trap section 26 and as the insects hit the inclined guide bars 27 they will be directed toward the entrance slot 28. It can be seen that if the flies or insects fly outward when coming into engagement with the inclined bars 27, the same will hit the foraminous front wall 30 and thus be prevented from flying out of the trap. It is evident that after the flies crawl through the slot 28, into the upper top section 25, that they will be confined in the trap section and thus further prevented from flying about the house or room where the trap may be associated.

From the foregoing description, it can be seen that an improved trap has been provided for association with transparent bodies for effectively catching insects which might be attracted by the light rays coming therethrough.

Changes in details may be made without departing from the spirit or scope of this invention; but,

I claim:

1. An insect trap comprising a body having a lower wall provided with an inlet, transversely extending bails carried by the upper wall of said body and suspending means slidably carried by said bails for permitting movement of the body into an operative position.

2. An insect trap comprising a body having a lower wall provided with an entrance, hanger means, and hanger engaging means extending transversely across the upper wall of the body and slidably engaged with said hanger means to permit sliding movement of the body into an operative position when suspended for use by said hanger means.

3. An insect trap consisting of an elongated body having foraminous front and rear walls and having a lower wall provided with an entrance slot, transversely extending bails carried by the upper wall of the body, and loops slidably carried by the bails and adapted to engage supporting members and slidably mount the trap for movement into an operative position.

4. As a new article of manufacture, an insect trap including a frame consisting of side walls, parallel top and bottom walls, and oppositely disposed inclined guide bars arranged in upwardly converging relation with the frame intermediate the top and bottom walls and having an entrance slot at their meeting ends, foraminous rear and front walls for the body, the rear edge of the lower wall having a notch formed therein extending substantially the entire length thereof, the inner wall of the trap section terminating at the inclined guide bars.

5. As a new article of manufacture, an insect trap comprising a frame including upper and lower walls, end walls, oppositely disposed inclined guide strips disposed in the frame intermediate the upper and lower walls in upwardly converging relation and having an entrance slot between their upper ends, foraminous front and rear walls, the front walls extending at a point below the rear wall, the top wall having a fly outlet opening formed therein, pivoted bails carried by the top walls adjacent to the opposite ends thereof, and loops slidably carried by the bails for suspending the trap from supporting means and permitting sliding movement thereof into an operative position.

WILLIAM A. PEPPER.